United States Patent [19]

Blonstein et al.

[11] Patent Number: 5,172,237
[45] Date of Patent: Dec. 15, 1992

[54] HIGH QUALITY COLOR IMAGE COMPRESSION SYSTEM

[75] Inventors: Steven M. Blonstein, San Jose; James D. Allen, Santa Cruz; Kevin P. Corcoran, Fremont, all of Calif.

[73] Assignees: Ricoh Corporation, Menlo Park, Calif.; Ricoh, Ltd., Japan

[21] Appl. No.: 811,468

[22] Filed: Dec. 19, 1991

Related U.S. Application Data

[63] Continuation of Ser. No. 445,387, Dec. 4, 1989, abandoned, which is a continuation of Ser. No. 353,006, May 17, 1989, Pat. No. 5,034,825.

[51] Int. Cl.5 .............................................. H04N 1/41
[52] U.S. Cl. .................................. 358/261.3; 358/426; 358/458; 358/75; 382/56
[58] Field of Search ................... 358/261.1, 261.3, 458, 358/426, 75, 56

[56] References Cited

U.S. PATENT DOCUMENTS

| | | | |
|---|---|---|---|
| 3,825,832 | 7/1974 | Frei et al. | 358/135 |
| 4,661,862 | 4/1987 | Thompson | 358/335 |
| 4,716,453 | 12/1987 | Pawelski | 358/13 |
| 4,725,887 | 2/1988 | Gonzales et al. | 358/135 |
| 4,729,021 | 3/1988 | Kondo | 358/135 |
| 4,743,959 | 5/1988 | Frederiksen | 358/11 |
| 4,758,885 | 7/1988 | Sasaki et al. | 358/80 |
| 4,783,841 | 11/1988 | Crayson | 382/56 |
| 4,797,729 | 1/1989 | Tsai | 358/13 |
| 4,941,194 | 7/1990 | Shimura | 382/56 |
| 4,965,845 | 10/1990 | Chan et al. | 382/56 |
| 4,975,768 | 12/1990 | Takaraga | 358/75 |
| 5,049,990 | 9/1991 | Kondo et al. | 358/426 X |
| 5,057,939 | 10/1991 | Kirk | 358/426 |

OTHER PUBLICATIONS

Hahn and Potgieser, *Video Conferencing Philips Telecommunication and Data Systems Review*, 614 PTR vol. 47, No. 2, Jun., 1989.

*Primary Examiner*—Kenneth A. Wieder
*Assistant Examiner*—Glenn W. Brown
*Attorney, Agent, or Firm*—Heller, Ehrman, White & McAuliffe

[57] ABSTRACT

A color image compression system and method provides an improved technique of combining various image processing techniques to obtain high quality color image compression. The present invention provides color image compression, especially high quality original images that require up to 24 bits of data per pixel. The present invention utilizes a delta quantizing technique between an array of pixels to provide an improved color image compression aspect.

21 Claims, 5 Drawing Sheets

COLOR IMAGE COMPRESSION FLOWCHART

INDIVIDUAL PIXEL REPRESENTED BY
24 BITS OF DATA (TYPICALLY).

FIG.-3

$$\begin{array}{ccccc} 0 & -1 & -1 & -1 & 0 \\ -1 & 1 & 4 & 1 & -1 \\ -1 & 4 & 10 & 4 & -1 \\ -1 & 1 & 4 & 1 & -1 \\ 0 & -1 & -1 & -1 & 0 \end{array}$$

FIG.-4

$$\begin{array}{c} Y \\ I \\ Q \end{array} = \begin{array}{ccc} a_{11} & a_{12} & a_{13} \\ a_{21} & a_{22} & a_{23} \\ a_{31} & a_{32} & a_{33} \end{array} \begin{array}{c} R \\ G \\ B \end{array}$$

.       .   .              I₁₁     I₁₂
        Q                        I_avg
.   .   .   .              I₂₁     I₂₂

```
* * * * A B * * * * * *                        EXAMPLE
* * * * C ? / — — — — —      A  B            125    130
— — — — / / / — — — — —      C  ? /          102     ?    /
— — . — — — — — — — — —      / / /            /      /    /
```

DELTA QUANTIZE TABLE
Z

| N1 | P1 |
|---|---|
| N2 | P2 |
| N3 | P3 |
| N4 | P4 |
| N5 | P5 |
| PN6 | |

FIG.−9

Y DATA
−1

| −7 | +5 |
|---|---|
| −15 | +15 |
| −29 | +35 |
| −57 | +61 |
| −91 | +91 |
| +127 | |

FIG.−10B

Y DATA
+1

| −5 | +7 |
|---|---|
| −13 | +17 |
| −27 | +37 |
| −55 | +63 |
| −89 | +93 |
| +127 | |

FIG.−10A−1

I & Q DATA

| −3 | +5 |
|---|---|
| −11 | +13 |
| −23 | +25 |
| −45 | +47 |
| −81 | +83 |
| +129 | |

HIGH QUALITY COLOR IMAGE COMPRESSION SYSTEM

This is a continuation of application Ser. No. 445,387, filed Dec. 4, 1989, now abandoned, which is a continuation of Ser. No. 353,006, filed May 17, 1989, now U.S. Pat. No. 5,034,825.

FIELD OF THE INVENTION

The present invention relates to a color image compression system method. More particularly, the present invention relates to color image compression techniques for high quality original color images that require up to 24 bits of data per pixel. The original color images can contain up to 16 million different colors.

BACKGROUND OF THE INVENTION

Various color compression algorithms for original color images are known in the art. Although 24-bit per pixel color images (hereinafter referred to as "true color") are not yet in widespread use, it is expected that there will be a requirement for such true color images, for color facsimile, color copiers, color printers, and color scanners. Most work up to the present time has been done in color image transmission.

Because of the amount of data contained in a "true color" image, it is very important to be able to compress the data before transmission in order to save expensive telecommunications bandwidth. There has been development on algorithms suitable for adoption by the CCITT (Consulting Committee on International Telephone and Telegraph). This has led to many offerings, and at the present time it is believed that an adaptive discrete cosine transform (ADCT) will be the algorithm adopted by the CCITT.

It would be highly desirable to provide an improved high quality color image compression system and method which is suitable for color image compression transmission techniques.

SUMMARY OF THE INVENTION

It is an object of the present invention to provide an improved high quality color image compression system and method.

The present invention provides a novel means and method of combining various image processing techniques to obtain high quality color image compression. The present invention recognizes how the human eye perceives color and frequency information in a quality color image. It is desired that the color image should degrade "gracefully" at high compression ratios by becoming "softer" and not to have geometric shapes appear.

Briefly, the improved color image compression system and method according to the present invention includes the steps of acquiring a true color image, usually in an RGB (Red, Green, Blue) format. The next step includes the conversion of the RGB acquired data from RGB color space to YIQ color space. The present invention next provides for spatial reduction of the YIQ planes. The next step of color image compression provides delta quantizing of each of the color planes followed by run length limited (RLL)/entropy encoding of the reduced image data and, finally, storing and transmitting the compressed color images.

Other objects, features and advantages of the present invention will become apparent from the following detailed description when taken in conjunction with the accompanying drawings.

BRIEF DESCRIPTION OF THE DRAWINGS

The accompanying drawings which are incorporated in and form a part of this specification illustrate an embodiment of the invention and, together with the description, serve to explain the principles of the invention.

FIGS. 10A-1, 10A-2 and 10B depict typical values of a delta quantized table used for Y, I and Q data.

DETAILED DESCRIPTION OF THE DRAWINGS

Reference will now be made in detail to the preferred embodiment of the invention, an example of which is illustrated in the accompanying drawings. While the invention will be described in conjunction with the preferred embodiment, it will be understood that it is not intended to limit the invention to that embodiment. On the contrary, it is intended to cover alternatives, modifications and equivalents as may be included within the spirit and scope of the invention as defined by the appended claims.

Figure 1:
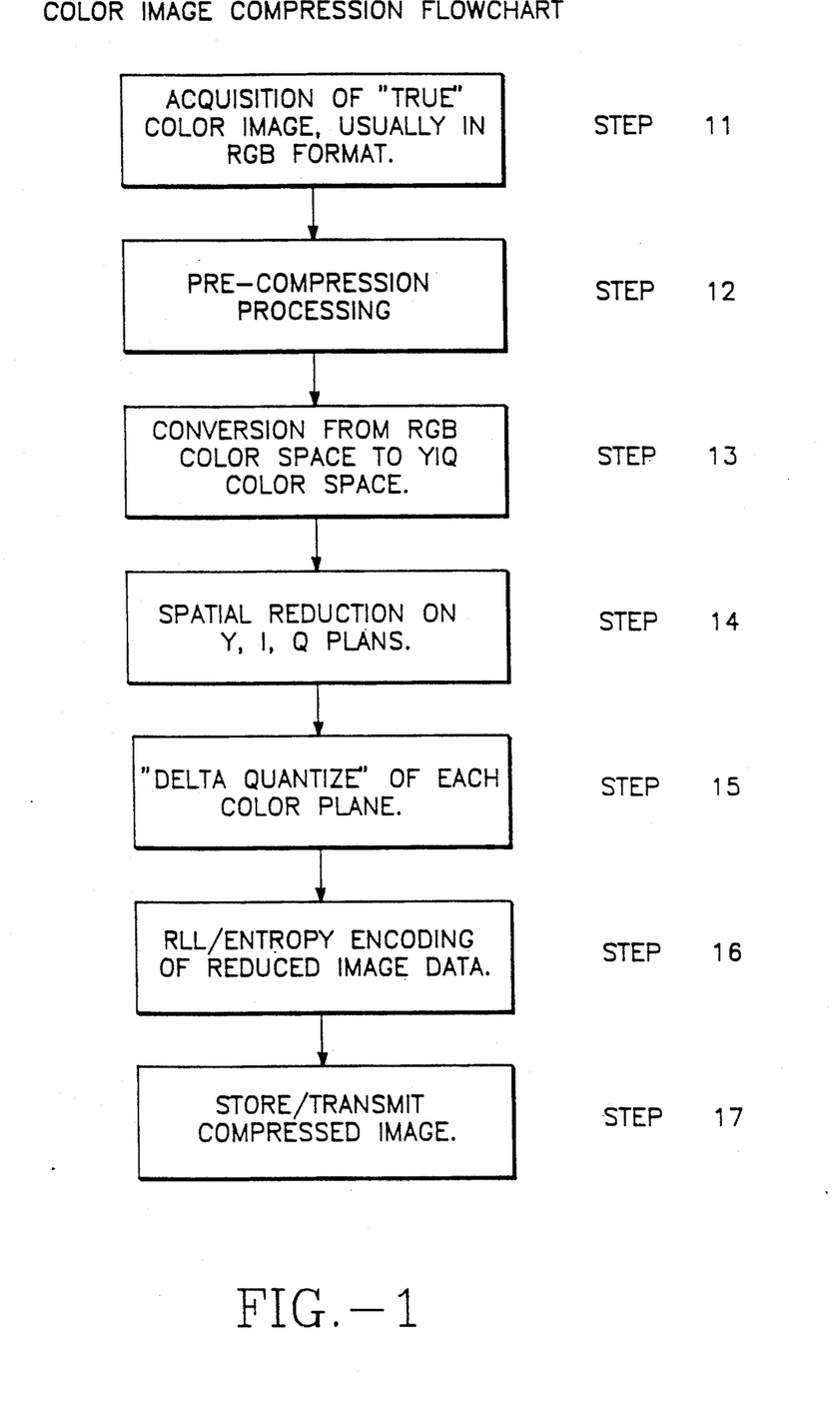
FIG. 1 depicts a color image compression flow chart according to the present invention.

Referring now to FIG. 1, a color image compression flow chart according to the present invention is depicted. The color image compression flow chart of FIG. 1 illustrates the sequence of steps from acquiring the color image to providing the storing and transmission of the compressed color image.

In FIG. 1, the first step 11 includes the acquisition of a "true" color image, usually in a RGB (red, green, blue) format. The acquisition of color image data in an RGB format is a well known technique.

The next step 12 includes the step of precompression processing.

The next step 13 provides the conversion from RGB color space to YIQ color space, which is also a known technique.

The next step 14 provides spatial reduction on the YIQ color space (on the YIQ planes).

Step 15 provides for a delta quantizing of each of the YIQ color planes, as will be described in further detail below.

Step 16 provides the step of run length limited (RLL) and entropy encoding of the reduced image data.

Finally, step 17 includes the step of storing and transmitting the high quality color compression image data according to the present invention.

Further details and aspects of the color image compression flow chart of FIG. 1 will be described in more detail in connection with the remaining Figures.

Figure 2:
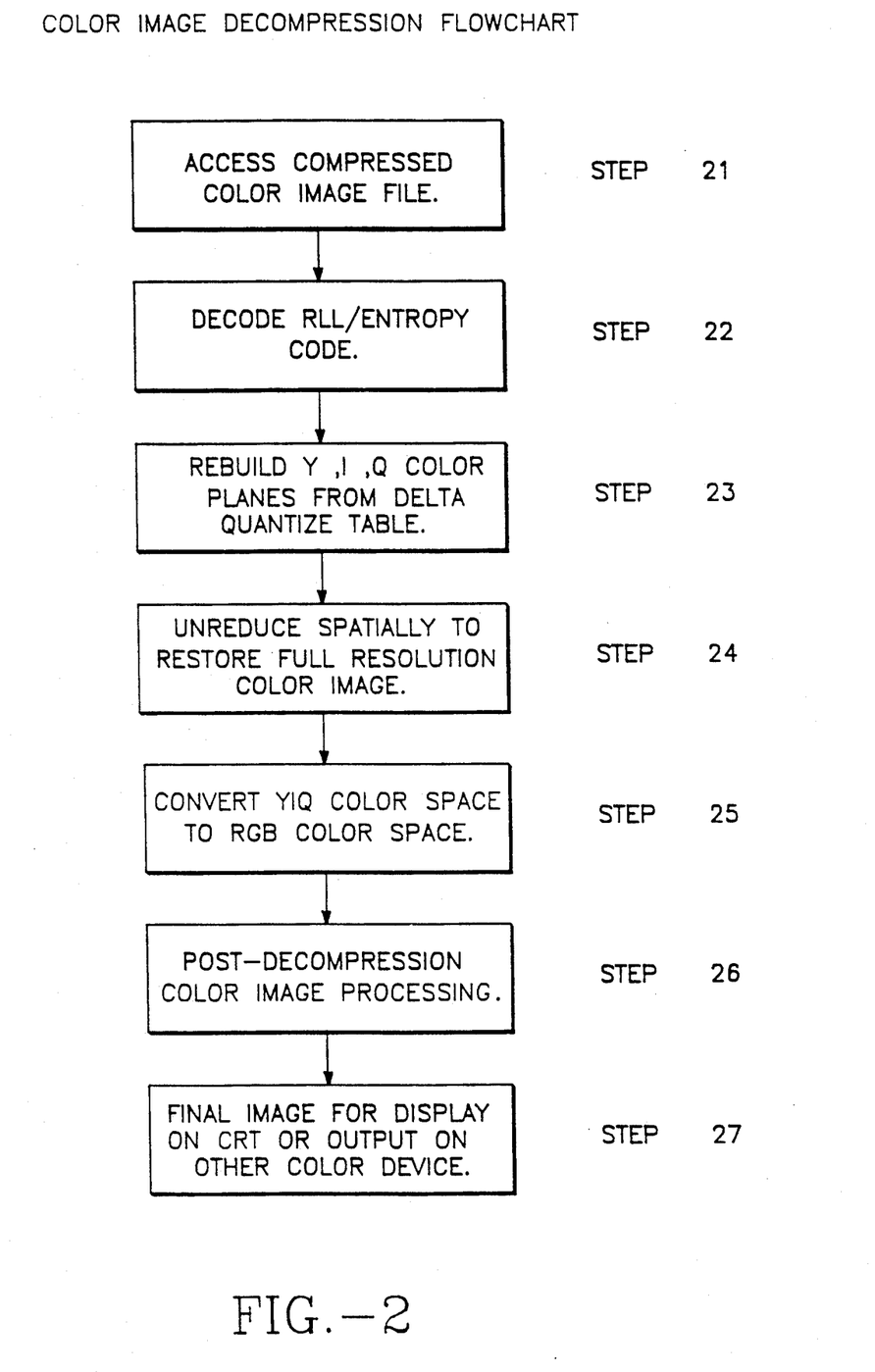
FIG. 2 depicts a color image decompression flow chart according to the present invention.

Similarly, FIG. 2 depicts a color image decompression flow chart according to the present invention.

In Step 21, the decompression algorithm accesses the compressed color image file.

In Step 22, the decompression algorithm decodes the run length limited/entropy code of the compression algorithm.

At Step 23, the decompression algorithm rebuilds the YIQ color planes from the delta quantized table.

At Step 24, the decompression algorithm reverses (expands) the spatial reduction to restore full resolution color image of the compressed color images.

At Step 25, the decompression algorithm converts the YIQ color space to RGB color space.

Step 26 provides post decompression color image processing according to the decompression algorithm.

Finally, at Step 27, the final image which is decompressed is displayed on a CRT or output on another color device.

Referring now to FIGS. 3-10B, the more detailed aspects of the decompression algorithm of FIG. 1 will allow now be described in more detail.

Figure 3:
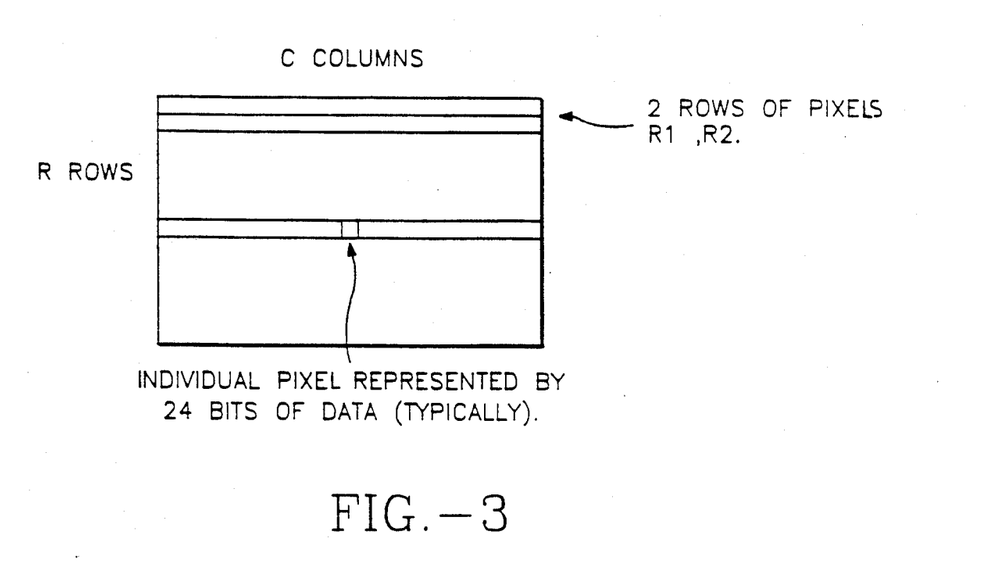
FIG. 3 depicts a sample image illustrating the acquisition of true color image.

FIG. 3 shows a sample color image with parameters to describe a sample image representation. FIG. 3 depicts the acquisition of true color image, usually in the RGB format, which is Step 11 in FIG. 1. In FIG. 3, the total number of pixels in a color image is given by R rows and C columns. Each pixel is typically represented by 24 bits of data ("true" color). The 24 bits of data is typically broken down to eight bits each for red, green and blue (RGB). The color image can be from a plurality of input sources such as a color scanner, mass storage device, video capture device, and the like. Some prior art approaches require the whole image to be buffered before color processing may start. Other types require eight lines or sixteen lines to be buffered. The present invention provides for color image compression on a minimum of just two lines of pixel data, e.g., R1, R2 from FIG. 3. This minimizes the buffer requirements in contrast with other prior art approaches.

Figure 4:
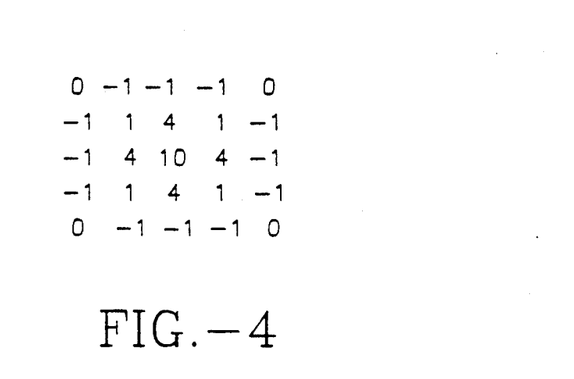
FIG. 4 depicts a kernel representation utilized in the present invention.

The pre-compression processing Step 12 of FIG. 1 will now be described in more detail. Before any compression takes place, it is often desirable to pass a convolution across the color image. The present high quality color compression technique according the present invention is improved if the image is pre-filtered by a convolution that performs both edge enhancement and a certain degree of smoothing. An example of a kernel is illustrated in FIG. 4. It should be noted that $3 \times 3$ or $5 \times 5$ convolutions can be applied. The numbers illustrated in FIG. 4 serve only as an example. Kernels are normally, but not necessarily, symmetric.

The Step 13 conversion from RGB color space to YIQ color space will now be described in more detail.

Figure 5:
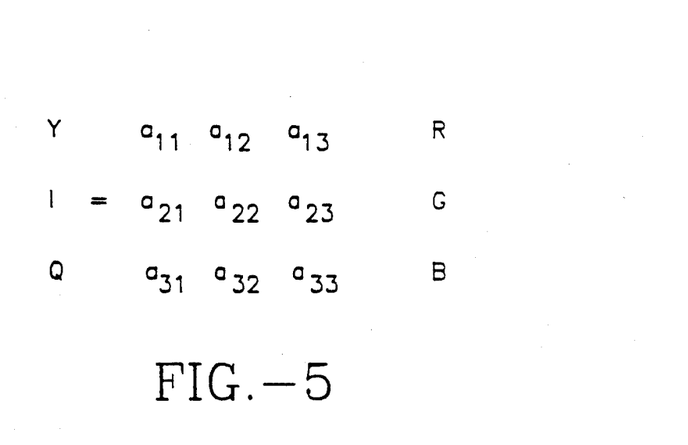
FIG. 5 depicts a conversion from RGB to YIQ color space.

The standard RGB format desirably is converted to YIQ color space. Standard linear transformations are used, one of which is depicted in FIG. 5. The transformation may be accomplished through the use of lookup tables as opposed to matrix multiplication. The transformation to YIQ color space provides the ability to perform spatial resolution reduction on each plane (each YIQ plane) individually. Typically, the Q plane can be spatially reduced more than the I plane, which can be reduced more than the Y plane.

The Step 14 of spatial reduction on the YIQ planes of FIG. 1 will now be described in more detail.

Spatial reduction is applied to each of the three planes (YIQ planes), depending upon the compression ratio required or desired. For very high quality results, but relatively low compression ratio (about eight bits per pixel), no spatial reduction need be used. For around three to four bits per pixel, the scheme depicted in FIGS. 6A, 6B and 6C might be utilized.

Figure 6A:
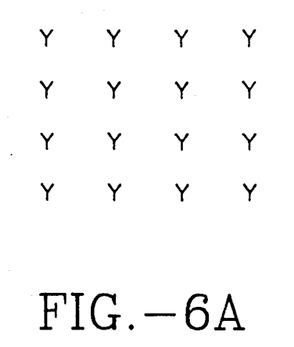
FIGS. 6A, 6B, 6C and 6D depict spatial reduction of the YIQ color planes.
Figure 6B:
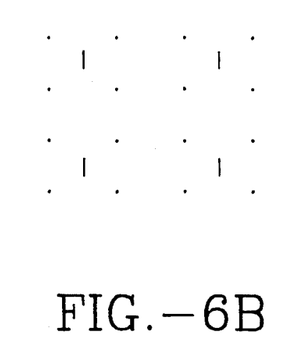
Figure 6C:
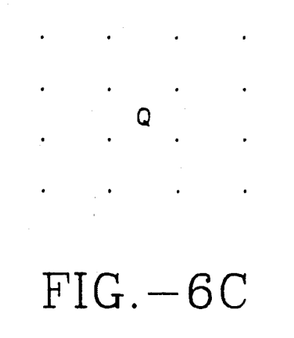
Figure 6D:
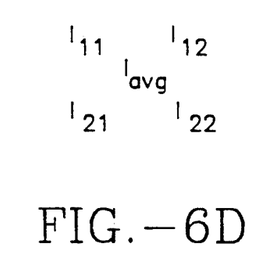

In FIG. 6A, no spatial reduction is used on the Y plane. In FIG. 6B, a 2:1 spatial reduction is utilized on the I plane. In FIG. 6C, a 4:1 reduction is utilized on the Q plane.

Figure 7:
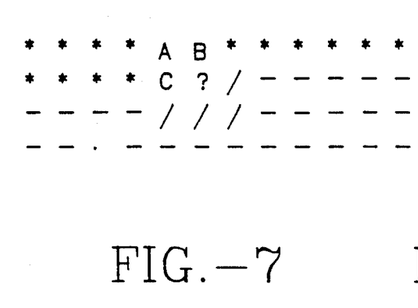
FIG. 7 depicts a series of pixels after spatial reduction.

The method used to get the average value may be varied. For example, the average of the I plane pixel may be depicted, as in FIG. 6D, and it is desired to determine what is $I_{avg}$. It is possible to use one of the following calculations:

1) $I_{avg} = I_{11}$
2) $I_{avg} = (I_{11} + I_{12} + I_{21} + I_{22})/4$
3) Some other weighted average of surrounding pixels The delta quantizing Step 15 of each color plane (YIQ planes) will now be described in more detail. Consider the example depicted in FIG. 7, which shows a series of pixels, after spatial reduction. The illustration represents one of the three color planes (YIQ). Assume that the data in FIG. 7 is from the Y plane, where the ABC pixels are previously processed pixels, the "?" is the current pixel under examination, and where the "-", "/" are yet unprocessed pixels, and where the "/" indicates that error diffusion will be applied. In FIG. 7, the "A" pixel is proximate to the "?" pixel, being within the scan line one line above and one pixel to the left of the "?" pixel. Similarly, the "B" pixel is directly or immediately above the "?" pixel, and the "C" pixel is proximate (directly left) of the "?" pixel.

Figure 8A:
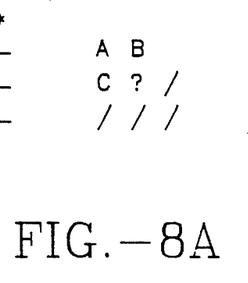
FIG. 8A and 8B depicts an illustration of a particular set of pixel values about to be delta quantized.
Figure 8B:
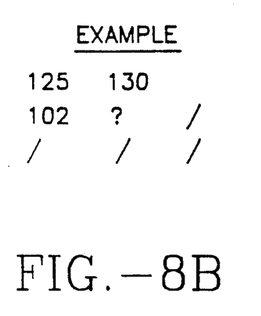

In order to understand the aspects of the present invention, consider one particular set of values to be delta quantized as depicted in FIGS. 8A and 8B. Focus in on one of the eight pixels of most interest in FIG. 7 (shown in FIG. 8A) and assign hypothetical values as illustrated in FIG. 8B.

In FIG. 8B, the numbers 125, 130 and 102 have already been quantized. Assume that the prequantization value for "?" is 147. The first task is to decide form which pixel to "delta quantize." The present invention utilizes a method which calculates ABS (B−A) and (C−A). Whichever absolute difference is greater, the "?" pixel is quantized from that one pixel whose difference result was greater. In the example of FIG. 8B, 102 is clearly further from 125 than 130. Thus, the "?" pixel is quantized from 102.

Figure 9:
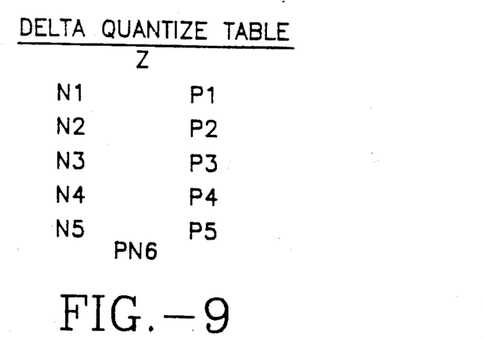
FIG. 9 depicts a delta quantized table.

FIG. 9 depicts a representation of a delta quantized table. The delta quantized table is an asymmetric nonlinear quantized table, different for each of the YIQ planes. A quantized table can be made up of any number of delta quantized values, say 12, in one preferred embodiment. These delta quantized values are represented in FIG. 9.

In FIG. 9, the N stands for negative, the P stands for positive. Note that any number of values could be used, although 12 is the number in the preferred embodiment.

In FIG. 9, the table is asymmetric, i.e., ABS(N3-N2) is not necessarily equal to ABS(P3-P2). The reason for this is that the human eye perceives small decreases in intensity more easily than small increases.

The table in FIG. 9 is also non-linear, i.e., $ABS(N_x-N_{x-1})>ABS(N_{x-1}-N_{x-2})$. Again, this attributes to the human eye characteristic that large intensity changes are easily perceived, but that the magnitude of the intensity is hard to judge. Thus, more values can be assigned to the more critical "small" steps.

Figure 10A:
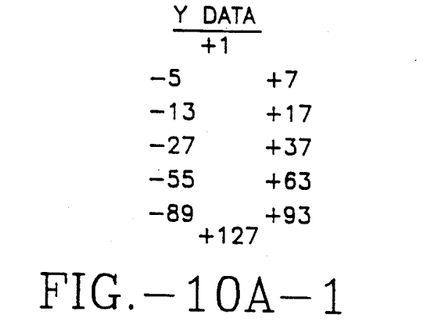
Figure 10A:
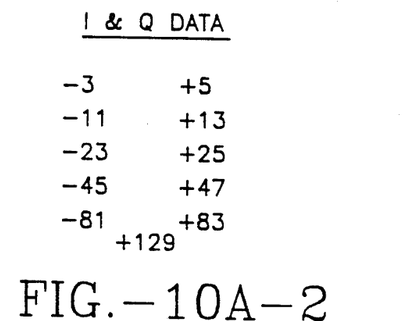

FIGS. 10A-1, 10A-2, and 10B depict typical tables used for Y, I and Q data.

Figure 10B:
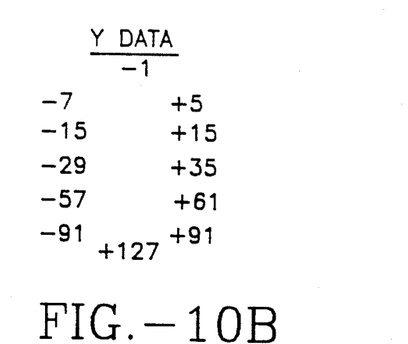

Another feature of the present invention is to use delta quantized tables that change between odd and even pixel numbers. For example, for the first pixel in a line, use the table in FIG. 10A-1. Then, when using the second pixel in the line, processing the values slightly, as shown in FIG. 10B.

A similar thing can be done to the I and Q data. This improves the compression considerably. The main reason is that the value of the Z token now stretches from $+1$ to $-1$ from pixel to pixel. This provides a so-called "wide zero" effect, resulting in longer runs of Z tokens and subsequently greater compression ratios.

For pixels 1, 3, 5, 7, etc., use the table in FIGS. 10A-1 and 10A-2 as the delta quantized table. For pixels, 2, 4, 6, 8, etc., use the table in FIG. 10B. Given the example delta quantized table, it is now possible to complete the example of FIG. 8B.

Using the fact that 102 is a greater distance from 125 than 130 is and that the "?" pixel's prequantization, the pixel value is 147 is given a delta of +45. Looking at FIG. 10A-1, +45 is closest to the P3 value which is assigned +37. Thus, the delta quantized value of "?" becomes 102+37, i.e., 139.

An error on the "?" pixel of negative eight was introduced. It is possible to limit the effect of the quantization error by error diffusing the difference to neighboring unquantized pixels. The four "/" pixels are, for example, increased by two (if the error is to be fully distributed).

Some special cases should be addressed at this time.

1) Border conditions are set so that the pixels have values 128, so that there is always something to quantize from.

2) If a "?" pixel data is exactly halfway between two table values, one of two possibilities may occur. The first is to randomly round the value up or down, but never in the same direction at all times. This could lead to chromatic distortions. In the second possibility, the delta quantized table should be set so that the above scenario cannot occur. This is achieved by making all $(P_x-P_{x-1})$ and $N_x-N_{x-1})$ odd.

The RLL/entropy encoding Step 16 of FIG. 1 will now be described in more detail below.

The tables shown in FIGS. 10A-1, 10A-2, and 10B tend to lead to occurrences of the zero value. Many of these occur in runs. Significant gains in coding result because of this phenomenon.

P1 and N1 are considered the highest probability to occur. They assigned the most privileged tokens A1 and B1. The decision has to be made which of these two will receive the 00 code and which the 01 code. A good method seems to be to choose the token that is closest to zero.

A sample RLL/entropy table is shown below in Table I:

TABLE I

| | |
|---|---|
| 00 = | B1 (if after Z) |
| 000 = | Isolated Z |
| 001 = | B1 (if not after Z) |

TABLE I-continued

| | |
|---|---|
| 01 = | A1 |
| 10f = | N2/P2 |
| 110f = | N3/P3 |
| 1110 0f = | N4/P4 |
| 11010f = | N5/P5 |
| 11101100 = | PN6 |
| 1110111{1}0w = | N*16 + 9 + W consecutive Zeros |
| 1111{1}0 = | N+2 consecutive Zeros | where:
  f = a single bit (0=N; 1=P)
  w = 4 bits, evaluated as number W=0-15
  {1} = N consecutive 1's The store and transmit compression image Step 17 of FIG. 1 will now be described in more detail:

FIG. 2 shows the decompression sequence. It follows the reverse sequence of the compression algorithm of FIG. 1.

The compressed file is taken and the RLL/entropy table is used to generate the values Z, N1, P1, etc., for the entire image.

Color planes are rebuilt using the reverse process that the delta quantizer used. For example:

| Y data | | | |
|---|---|---|---|
| 130 | 137 | 132 | 169 |
| 131 | P1 | N1 | P2 |

Consider the P1 value above. Because 137 is "further" from 130 than 131 is, it must have been delta quantized from 137. Thus, replace the P1 with 137+7 (taken from P1 in FIG. 10A-1 = 144.

| | | | |
|---|---|---|---|
| 130 | 137 | 132 | 169 |
| 131 | 144 | N1 | P2 |

Now the N1 uses the 144 due to the fact that 144 is further from 137 than 132. Thus, replace N1 by 144−7=137 (taken from N1 in FIG. 10B), and so on.

Once complete, this process leaves a full image that is complete except for any spatial "unreduction" that might be needed.

Spatial "unreduction" will depend upon the method that was used to do the original reduction. Referring to Step 24, if $I_{avg}=I_{11}$, then replace all missing pixels with $I_{11}$. If $I_{avg}$ was the average of four pixels, then the average is used to replace all missing pixels. More sophisticated schemes may be used to limit error sizes.

With all color planes restored to full resolution, YIQ can be converted back to RBG color space.

Smoothing/sharpening filters may be applied to the new image to remove unwanted characteristics of the compression/decompression stages.

Figure 11:
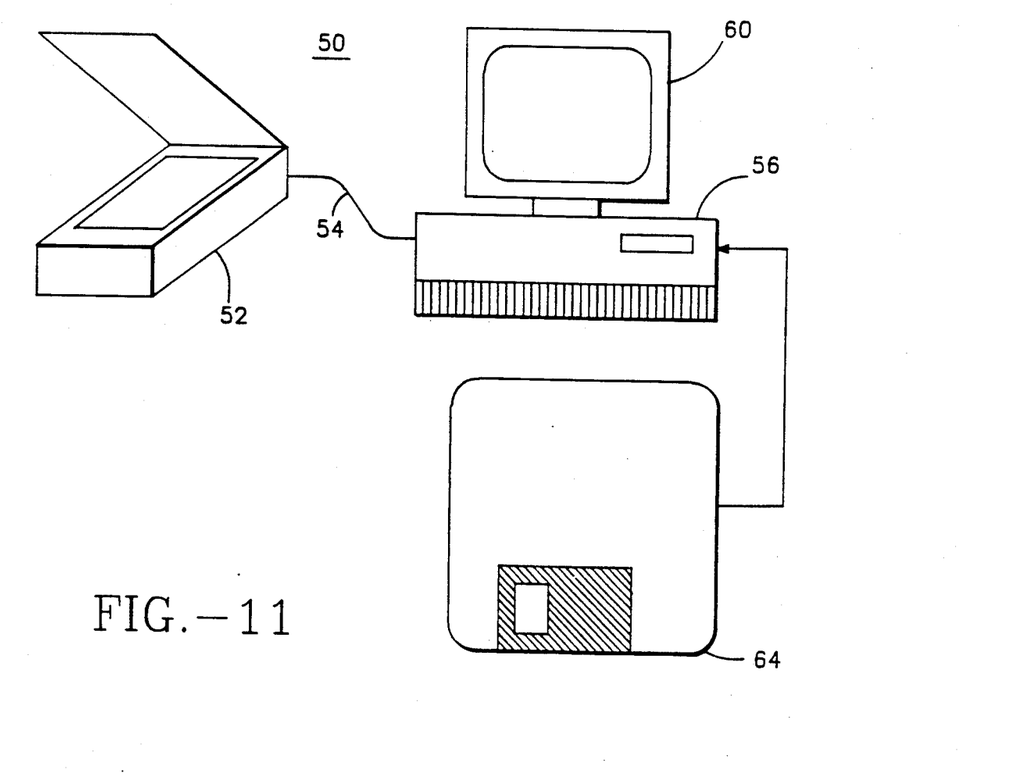
FIG. 11 depicts apparatus for a color compression system.

FIG. 11 shows an apparatus 50 for a color compression system utilizing aspects of the present invention. In FIG. 11, the system 50 includes a color image scanner 52 that typically produces 24 bits per pixel at 300 dots per inch. A typical image size is approximately 30 Mbytes of data for an 8.5×11 original document. The scanner 52 is connected via cable 54 to a PC interface. The cable 54 is typically SCSI, GPIB or the like.

The PC 56 includes a color monitor 60 to view scanned images. PC 56 either runs algorithm in software or, in the alternative, hardware performs compression on a scanned image. The hardware could be designed and implemented by one of ordinary skill in the art when utilizing aspects of the present invention.

The output of the compression algorithm could be a compressed image file small enough to fit on a single 1.4 Mbyte floppy disk 64, as depicted in FIG. 11. For example, by using 2:1 spatial compression on the Y plane, 4:1 on the I and Q planes, and then delta quantizing, the typical reduction is about 25:1. Thus, the original 30 Mbyte file becomes about 1.2 megabytes.

The foregoing description of a preferred embodiment of the invention has been presented for purposes of illustration and description. It is not intended to be exhaustive or to limit the invention to the precise form disclosed, and obviously many modifications and variations are possible in light of the above teaching. The present embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A color image compression method comprising the steps of
   acquiring first color image data representative of a color image in a first format having a plurality of first color planes,
   converting the acquired color image data to a second format having a plurality of second color planes,
   spatially reducing the color image data in said second format to form spatially reduced data, and
   delta quantizing one or more color planes of said spatially reduced data to form compressed color image data representative of said color image, wherein said color image includes at least first and second scan lines of pixel data, and wherein each pixel is represented by a certain number of bits of data, and wherein a value of a certain pixel to be delta quantized is determined by calculating the difference between a first pixel and a second pixel which is most proximate to said certain pixel and the difference between said first pixel and a third pixel which is almost most proximate to said certain pixel, all pixels contained within said first and second scan lines, and assigning whichever value is greater to said certain pixel.

2. A method as in claim 1 including the step of encoding said compressed image data.

3. A method as in claim 2 including the step of storing the encoded compressed image data.

4. The method as in claim 3 including the step of transmitting said encoded compressed image data.

5. A color image compression method comprising the steps of
   spatially reducing color image data having a plurality of color planes to form spatially reduced color image data, and
   delta quantizing said spatially reduced data to form a compressed color image, wherein said color image includes at least first and second scan lines of pixel data, and wherein each pixel is represented by a certain number of bits of data, and wherein a value of a certain pixel to be delta quantized is determined by calculating the difference between a first pixel and a second pixel which is most proximate to said certain pixel and the difference between said first pixel and a third pixel which is almost most proximate to said certain pixel, all pixels contained within said first and second scan lines, and assigning whichever value is greater to said certain pixel.

6. A color image compression system as in claim 5 wherein the delta quantizing step includes the step of delta quantizing each color plane of said spatially reduced data.

7. A color image compression system comprising
   means for acquiring first color image data representative of a color image in the first format having a plurality of first color planes,
   means for converting the acquired color image to a second format having a plurality of second color planes,
   means for spatially reducing the color image data in said second format to form spatially reduced data, and
   means for delta quantizing one or more color planes of said spatially reduced data to form compressed color image data representative of said color image, wherein said color image includes at least first and second scan lines of pixel data, and wherein each pixel is represented by a certain number of bits of data, and wherein a value of a certain pixel to be delta quantized is determined by calculating the difference between a first pixel and a second pixel which is most proximate to said certain pixel and the difference between said first pixel and a third pixel which is almost most proximate to said certain pixel, all pixels contained within said first and second scan lines, and assigning whichever value is greater to said certain pixel.

8. A system as in claim 7 including means for encoding said compressed image data.

9. A system as in claim 8 including means for storing the encoded compressed image data.

10. A system as in claim 9 including means for transmitting said encoded compressed image data.

11. A color image compression system as in claim 10 wherein the delta quantizing means includes means for delta quantizing each color plane of said spatially reduced data.

12. The system as in claim 11 wherein said first format is a red-green-blue (RBG) format.

13. The system as in claim 12 wherein said second format is a YIQ format.

14. A system as in claim 13 wherein said means for delta quantizing includes a delta quantized table for storing delta quantized values for each of said planes.

15. A system as in claim 14 wherein said first pixel is a pixel within a scan line immediately above and to the left of said certain pixel.

16. A system as in claim 15 wherein said second pixel is immediately above said certain pixel.

17. A system as in claim 16 wherein said third pixel is within the same scan line and immediately to the left of said certain pixel.

18. A system as in claim 14 wherein said delta quantized table is linear.

19. A system as in claim 14 wherein said delta quantized table is non-linear.

20. A system as in claim 14 wherein said delta quantized table is asymmetric.

21. A color image compression system comprising
   means for spatially reducing color image data having a plurality of color planes to form spatially reduced color image data and means for delta quantizing said spatially reduced data to form a compressed color image wherein said color image includes at least first and second scan lines of pixel data, and wherein each pixel is represented by a certain number of bits of data, and wherein a value of a certain pixel to be delta quantized is determined by calculating the difference between a first pixel and a second pixel which is most proximate to said certain pixel and the difference betwee said first pixel and a third pixel which is also most proximate to said certain pixel, all pixels contained within said first and second scan lines, and assigning whichever value is greater to said certain pixel.

* * * * *